United States Patent [19]
Liu et al.

[11] Patent Number: 5,539,543
[45] Date of Patent: Jul. 23, 1996

[54] RECONFIGURABLE OPTICAL INTERCONNECTIONS VIA DYNAMIC COMPUTER-GENERATED HOLOGRAMS

[75] Inventors: Hua-Kuang Liu, Pasadena; Shaomin Zhou, Rowland Heights, both of Calif.

[73] Assignee: The United States of America as represented by the Administrator of the National Aeronautics and Space Administration, Washington, D.C.

[21] Appl. No.: 192,476

[22] Filed: Jan. 27, 1994

[51] Int. Cl.[6] .............................. G02B 5/32; G02G 1/29
[52] U.S. Cl. .............................. 359/15; 359/9; 359/298; 359/320; 365/64
[58] Field of Search .............................. 359/9, 11, 15, 359/21, 22, 298, 320; 365/64; 382/31; 395/25

[56] References Cited

U.S. PATENT DOCUMENTS

| | | | |
|---|---|---|---|
| H738 | 2/1990 | McManus et al. | 359/15 |
| 3,868,655 | 2/1975 | Filippazzi | 365/49 |
| 4,620,293 | 10/1986 | Schlunt et al. | 364/845 |
| 4,824,192 | 4/1989 | Roberts | 359/22 |
| 4,877,297 | 10/1989 | Yeh | 359/11 |
| 4,946,253 | 8/1990 | Kostuck | 359/15 |
| 5,111,314 | 5/1992 | Leib | 359/29 |
| 5,115,497 | 5/1992 | Bergman | 395/375 |
| 5,121,231 | 6/1992 | Jenkins et al. | 359/7 |
| 5,129,041 | 7/1992 | Pernick et al. | 395/25 |
| 5,132,813 | 7/1992 | Caufield | 359/11 |
| 5,159,473 | 10/1992 | Feldman | 359/1 |
| 5,170,269 | 12/1992 | Lin et al. | 359/9 |
| 5,220,622 | 6/1993 | Scarr | 382/31 |
| 5,220,644 | 6/1993 | Horan et al. | 395/25 |
| 5,247,593 | 9/1993 | Lin et al. | 385/17 |
| 5,256,869 | 10/1993 | Lin et al. | 250/21.9 |

OTHER PUBLICATIONS

J. W. Goodman et al., Optical Interconnections for VLSI Systems, Proc. IEEE, vol. 72, No. 7, pp. 850–866, Jul. 1984.
A. Husain, Optical Interconnect of Digital Integrated Circuits and Systems, SPIE, vol. 466, No. 24, pp. 10–20, 1984.
H. S. Stone, Parallel Processing With the Perfect Shuffle, Transactions on Computers, vol. C–20, No. 2, pp. 153–161, Feb. 1971.
M. A. Franklin, VLSI Performance Comparison of Banyan and Crossbar Communications Networks, IEEE Transactions on Computers, vol. C–30, No. 4, pp. 283–290, Apr. 1981.
J. Jahns et al., Crossover Networks and Their Optical Implementation, App. Optics, vol. 27, No. 15, pp. 3155–3160, Aug. 1988.
C. Clos, A Study of Non–Blocking Switching Networks, Bell Syst. Tech. J., vol. 32, pp. 406–424, 1953.
A. Marrakchi et al., Generation of Programmable Coherent Source Arrays Using Spatial Light Modulators, Optics Letters, vol. 16, No. 12, pp. 931–933, Jun. 1991.
J. Amako et al., Kinoform Using an Electrically Controlled Birefringent Liquid–Crystal Spatial Light Modulator, Applied Optics, vol. 30, No. 32, pp. 4622–4628, Nov. 1991.
A. Vanderlugt, Fresnel Transforms and Optical Computing, SPIE, vol. 634, Optical and Hybrid Computing, pp. 51–56, 1986.

(List continued on next page.)

*Primary Examiner*—Paul M. Dzierzynski
*Assistant Examiner*—Darren E. Schuberg
*Attorney, Agent, or Firm*—John H. Kusmiss

[57] ABSTRACT

A system for optically providing one-to-many irregular interconnections, and strength-adjustable many-to-many irregular interconnections which may be provided with strengths (weights) $w_{ij}$ using multiple laser beams which address multiple holograms and means for combining the beams modified by the holograms to form multiple interconnections, such as a cross-bar switching network. The optical means for interconnection is based on entering a series of complex computer-generated holograms on an electrically addressed spatial light modulator for real-time reconfigurations, thus providing flexibility for interconnection networks for large-scale practical use. By employing multiple sources and holograms, the number of interconnection patterns achieved is increased greatly.

3 Claims, 8 Drawing Sheets

OTHER PUBLICATIONS

S. Kirkpatrick et al., Optimization by Simulated Annealing, Science, vol. 220, No. 4598, pp. 671–681, May 1983.

M. R. Feldman, Iterative Encoding of High–Efficiency Holograms for Generation of Spot Arrays, Optics Letters, vol. 14, No. 10, pp. 479–481, May 1989.

V. E. Benes, On Rearrangeable Three–Stage Connecting Networks, Bell Sys. Tech. J., vol. 41, No. 5, pp. 1481–1492, Sep. 1962.

D. H. Lawrie, Access and Alignment of Data in an Array Processor, IEEE Trans. on Computers, vol. C–24, No. 12, pp. 1145–1155. Dec. 1975.

C. L. Wu et al., On a Class of Multistage Interconnection Networks, IEEE Trans. on Computers, vol. C–29, No. 8, pp. 694–702, Aug. 1980.

E. C. Tam et al., Spatial Light Modulator–Based Real–Time Multiple Beam Splitter, Optical Society of America, Technical Digest 1991 Annual Meeting.

RECONFIGURABLE OPTICAL INTERCONNECTIONS VIA DYNAMIC COMPUTER-GENERATED HOLOGRAMS

ORIGIN OF INVENTION

The invention described herein was made in the performance of work under a NASA contract, and is subject to the provisions of Public Law 96-517 (35 USC 202) in which the contractor has elected not to retain title.

TECHNICAL FIELD

The invention relates to a reconfigurable optical interconnection system for parallel optical computing, neural networks, optical communications and similar applications where reconfigurable electrical interconnection patterns are employed.

BACKGROUND ART

Existing electronic interconnection techniques have several physical limitations, such as poor synchronization and low bandwidth, which cannot support the necessary interconnection density (for example, $10^{10}$ processing elements per integrated circuit chip), speed (for example, GaAs based processing elements operating at 100 MHz), and signal bandwidth requirements. To offer a possible solution to these problems, optical interconnection techniques have been suggested. [J. W. Goodman et al., Proc. IEEE, 72, 850 (1984) and A. Husain, SPIE 466, 24, (1984)].

Noninterfering free-space optical interconnections possess the potential advantage of massive parallelism, high space bandwidth product (SBWP), high temporal bandwidth product (TBWP), low power consumption, low cross talk and low time skew as compared to electronic interconnections. Free-space optical interconnection techniques have the further potential advantage that they can be used for both chip-to-chip and chip-to-module interconnections. Attention has been given to the use of various optical techniques, such as classical optics, diffraction optics, integrated optics, and holographic optics. For the purpose of implementing some important interconnection architectures, such as perfect shuffle [H. S. Stone, IEEE Trans. Comp., C-20, 153 (1971)], crossbar [M. A. Franklin, IEEE Trans. Comp., C-30, 283 (1981)], multistage interconnection networks (MINs), i.e., crossover networks [J. Jahns et al., Appl. Opt. 27, 3155 (1988)], and Clos networks [C. Clos, Bell Syst. Tech. J., 32, 406 (1953)], and other similar interconnection networks.

Recently, real-time reconfigurable optical interconnection techniques have been developed for parallel optical computing, neural networks, and optical communications using electrically addressed spatial light modulators (ESLM) with computer-generated holograms (CGH). See, for example, A. Marrakchi et al., Opt. Lett. 16, 931 (1991); E. C. Tam et al., Technical Digest of the OSA 1991 Annual Meeting, 146 (1991); J. Amako et al., Appl. Op. 30, 4622, (1991); A. Varderlugt, SPIE 634, 51 (1986). However, for this ESLM-CGH approach to become practical, higher throughput and more complicated interconnections will be required. For example, prior art implementations represented by U.S. Pat. Nos. 4,946,253; 5,115,497; 5,159,473 and 5,170,269 use a plane wave input beam and a single hologram. The latter patent relies on a deformable mirror device (DMD), which adds complexity to the reconfigurable interconnections but is otherwise also representative of the prior art that relies upon a single plane wave input beam and a single hologram to provide a reconfigurable pattern of interconnections. Such prior-art approaches do not provide sufficient flexibility for a large enough interconnection network with high enough efficiency for large-scale practical use.

STATEMENT OF THE INVENTION

An optical system for providing dynamically programmable interconnections at spatial points of an array is based on computer-generated holograms (CGHs) applied to an array of pixels of an electrically addressed spatial light modulator (ESLM).

The criteria for computer-generation of the CGHs are array uniformity and diffraction efficiency, where uniformity is measured by a parameter which is defined as the root mean square of the intensities of the focal points in the array and diffraction efficiency is obtained by letting the sum of the powers in the signal spots of the array be divided by the total incident power. An optical system for many spatial interconnections comprises an array of $K_1 \times K_1$ light beams where $K_1$ is an integer greater than one, preferably implemented by a single laser diode and a multiple beam-splitter (MBS), for illuminating through a Fourier transform lens L an array of $K_1 \times K_1$ areas of an ESLM, each area being addressed by a sub-CGH. The combined output from $K_1 \times K_1$ sub-CGHs on the ESLM provides irregular interconnection patterns at an array of light detectors positioned at N×N focal points on the output plane of the ESLM. By effectively placing a $K_1 \times K_1$ binary spatial filter in the front of the ESLM, either as a discrete element or by incorporating it in the sub-CGHs, $2^{K_1 \times K_1}$ different irregular interconnection patterns may be provided.

An optical system for many strength-adjustable interconnections comprises a plurality of laser sources 1×i(i=0,1 . . . N−1) and a plurality of detectors 1×j(j=0,1 . . . N−1) interconnected by an ESLM with adjustable strength (weights) $W_{ij}$ by providing means for extending a linear array of N laser beams in one direction for illuminating each of N different columns of pixels in the ESLM, each of which is addressed by a sub-CGH to generate 1×j(j=0,1 . . . N−1) beams that illuminate the N detectors positioned in a linear array optically orthogonal to the columns of pixels. Optical means first Fourier transforms the 1×j(j=0,1 . . . N−1) beams and then combines the N diffraction fields to form N individual beams for N interconnections. The strength of the interconnection sensed at each detector is given by $$d_j = \sum_{i=0}^{N-1} W_{ji} S_i$$

where $W_{ji}$ is the weight of the ji$^{th}$ element in the interconnection weight matrix determined by the sub-CGHs which are readily adjustable in a computer used to generate the sub-CGHs.

BRIEF DESCRIPTION OF THE DRAWINGS

FIGS. 7(a) and 7(b) illustrate computer simulation results for an example of one-to-two interconnection CGH using the 1st and 8th order outputs.

FIGS. 8(a) and 8(b) illustrate computer simulation results for an example of one-to-fourteen interconnection CGH using ±1, ±3, ... , ±13 order outputs.

FIGS. 9(a) and 9(b) illustrate computer simulation results for an example of one-to-fifteen interconnection CGH using ±1, ±2, ... , ±7 order outputs.

FIGS. 10(a) and 10(b) illustrate experimental results.

DETAILED DESCRIPTION OF THE INVENTION

Figures 1A, 1B:
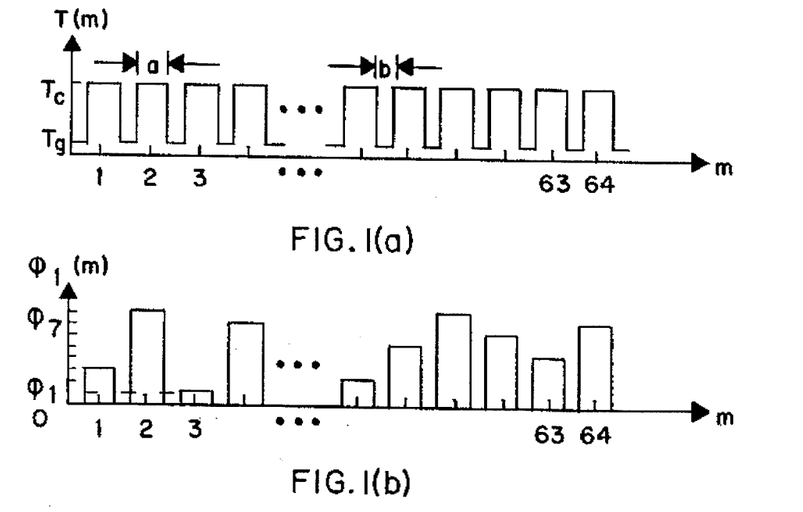
FIG. 1(a) and 1(b) illustrate the practical pixel spacing of a typical electrically addressed spatial light modulator (ESLM) consisting of m=64 cells of width a and gaps of width b between adjacent cells.

As shown in FIGS. 1(a) and 1(b), the practical pixel structure of a typical phase electrically addressed spatial light modulator (ESLM) consists of cells of width a and gaps of width b between any two cells. There is also leakage in each cell. In the design of a computer-generated hologram (CGH) which is to be entered into an ESLM, a realistic pixel with leakage should be considered. If m pixels are selected as one period and N subpixels are taken within each pixel to calculate the Fourier spectrum of the profile, the complex amplitude transmittance in the case of one dimension may be expressed as $$T_g; (m-1)N + \frac{a}{a+b} N + 1 \leq i < mN \quad (1)$$

$$t_i = \{T_c(1-s)e^{j(\phi_d+\phi_1)} + T_c s e^{j\phi_d}; (m-1)N +$$

$$1 \leq i < (m-1)N + \frac{a}{a+b} N$$

$m = 1, 2, \ldots, M; i = 1, 2, \ldots, MN;$
with $$\phi_l = \phi_d \frac{2\pi(l-1)}{L} \quad ; l = 1, 2, \ldots, L; \quad (2)$$

where s represents an assumed constant percentage of leakage, L is the phase level, $T_c$ and $T_g$ are the amplitude transmittances of the cell and gap, respectively, and $\phi_1$ is the phase shift corresponding to L different phase levels. The phase shift of the gap and dark cell ($\chi$1=1) are assumed to be zero and $\phi_d$, respectively. In the implementation of the present invention, it is preferable to so prepare the CGHs that the transmittances of all cells are at the same $T_c$ level, and only the phase shift is modulated.

The fast Fourier transform (FFT) algorithm is used to calculate the Fourier spectrum of Eq. (1), and annealing of the Fourier spectrum is achieved, such as by the simulated annealing iteration algorithm described by S. Kirkpatrick et al., Science, 220, 671 (1983) incorporated herein by reference to obtain the desired diffraction patterns. There are two criteria for designing the CGH: (1) array uniformity and (2) diffraction efficiency [M. R. Feldman et al., Opt. Lett., 14, 479 (1989)]. The uniformity of the array is measured by a parameter which is defined as the root mean square error of the intensities of the focal points in the array. The diffraction efficiency is obtained by letting the sum of the powers in the signal spots of the array be divided by the total incident power.

An overall error mass function E is defined as follows:

$$E = E_1 + E_2 \quad (3a)$$

$$E_1 = c_1 \sqrt{\sum_{k=1}^{k} (I_k - I_0)^2} \quad (3b)$$

$$E_2 = c_2 \left( \frac{n-1}{K} \right)^2 \quad (3c)$$

where $I_k$ is the intensity of the kth diffraction order, $I_o$ is the mean value averaged over all the diffraction orders, K is the total number of the focal points in the array, and $c_1$ and $c_2$ are the optimization coefficients between zero and one. The desired array of spots may be designed based on an error tolerance (or a minimum tolerable error mass function) given a priori.

A two-dimensional CGH may be obtained by the superposition of two one-dimensional CGH structures. However, for increasing diffraction efficiency, a two-dimensional simulated annealing iteration algorithm may be used to search directly for an optimal two-dimensional CGH structure.

One-to-Many Regular Interconnections

Figures 2A, 2B:
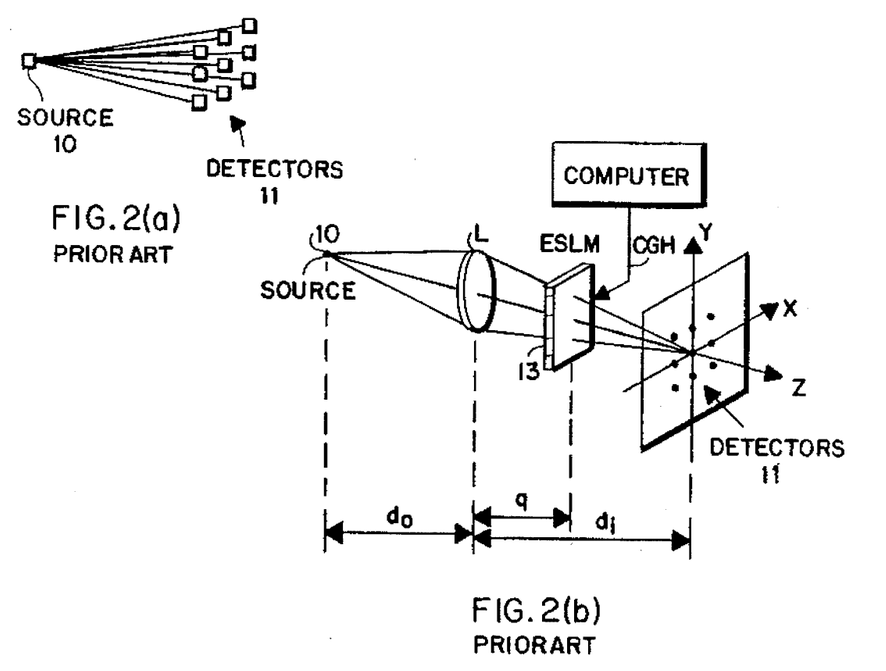
FIG. 2(a) illustrates conceptually the prior-art scheme for one-to-many regular reconfigurable optical interconnections.
FIG. 2(b) illustrates an optical implementation for that prior-art scheme where a single computer-generated hologram (CGH) stored in an ESLM is used to generate a regular array of interconnections using a single plane wave input beam.

Reconfigurable one-to-many regular interconnections illustrated conceptually in prior-art FIG. 2(a) comprises a single laser light source 10 and an array (N×N, N=3) of detectors 11 that can be implemented directly by means of a single complex amplitude (or phase) computer-generated hologram (CGH) on an electrically addressed spatial light modulator (ESLM) 13 which is illuminated by a laser light source S, e.g., a laser diode, through a Fourier transform lens L, as shown in FIG. 2(b). N×N multiple focal points will be formed on detectors 11 positioned on the focal plane of the ESLM. The detectors illuminated by the light from the source transmitted through the ESLM under control of the CGH conduct and thus provide interconnections between the two terminals of the detectors (photodiodes) at the spatial points of the array of detectors. The interval between two neighboring focal points can be controlled by changing the system parameters, such as object distance $d_o$, focal length of the lens and the separation q between lens L and the ESLM.

One-to-Many Irregular Interconnections

Figure 3A:
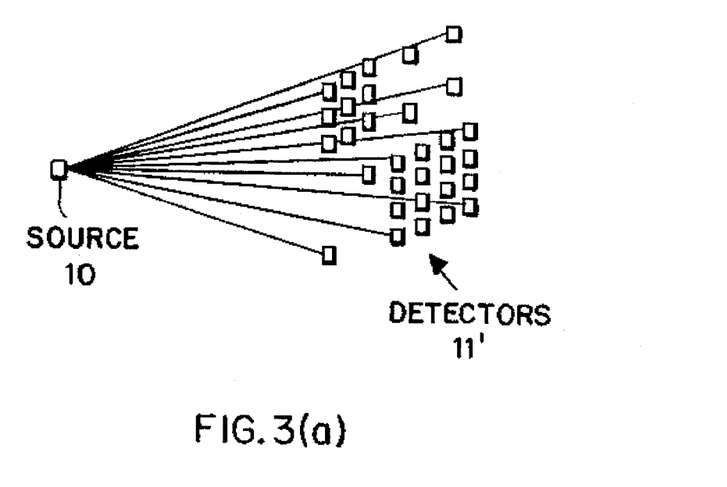
FIG. 3(a) illustrates conceptually a one-to-many irregular reconfigurable interconnections to be achieved by the present invention for greater flexibility.
Figure 3B:
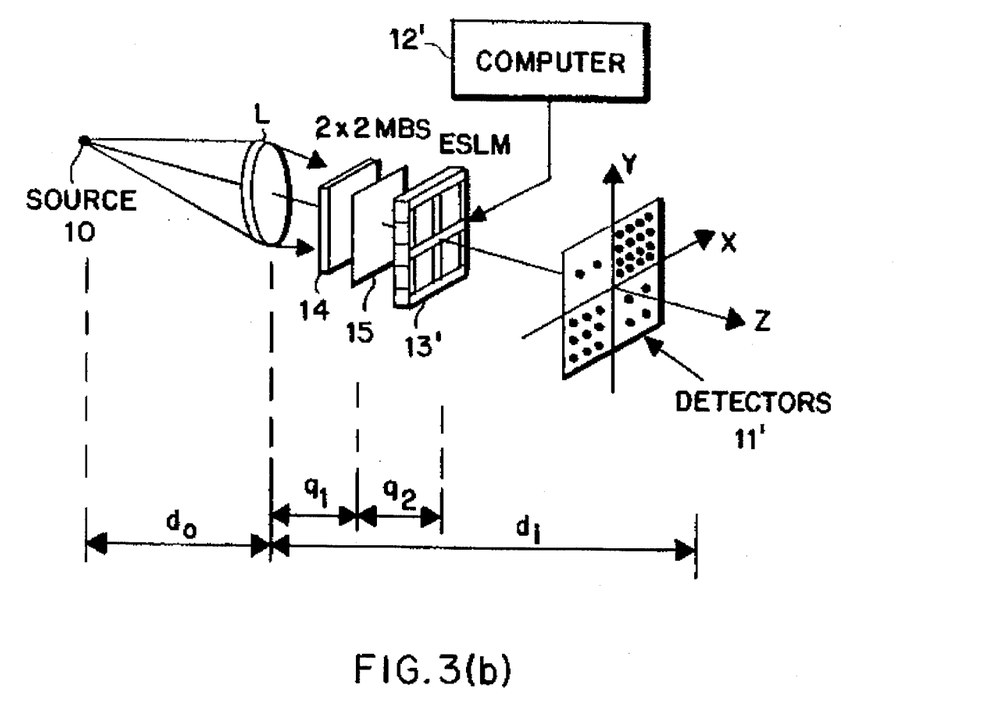
FIG. 3(b) illustrates an optical implementation of the irregular optical interconnections of FIG. 3(a).

Reconfigurable one-to-many irregular interconnections, illustrated conceptually in FIG. 3(a) as again comprising a light source 10 and an array of detectors 11', may be implemented by providing a source of multiple beams, such as a fixed $K_1 \times K_1$ ($K_1=2$) multiple beam splitter (MBS) 14 shown in FIG. 3(b), to provide $K_1 \times K_1$ parallel channels that illuminate $K_1 \times K_1$ different CGHs from a digital computer 12' on the spatial light modulator 13'. Each channel provides a pattern of regular interconnections illustrated as being one pattern in each of four quadrants for the case of $K_1=2$, but the combination of these $K_1 \times K_1$ channels realize multiple irregular interconnections at an array of detectors 11'. If a $K_1 \times K_1$ binary spatial filter array is placed in front or in back of the spatial light modulator 13', thereby producing a pattern of spots of no light onto the detectors from the spatial light modulator, whereby $2^{k1 \times k1}$ different irregular interconnection patterns (equal to 16 for the case of $K_1=2$) may be constructed by controlling the individual transmittance (opaque or transparent) in the filter array. The function of such a binary spatial filter 15 may be implemented in the digital computer by modifying the CGH generated according to the effect of the binary spatial filter superimposed on the CGH.

Strength-Adjustable Many-to-Many Interconnections

Figure 4A:
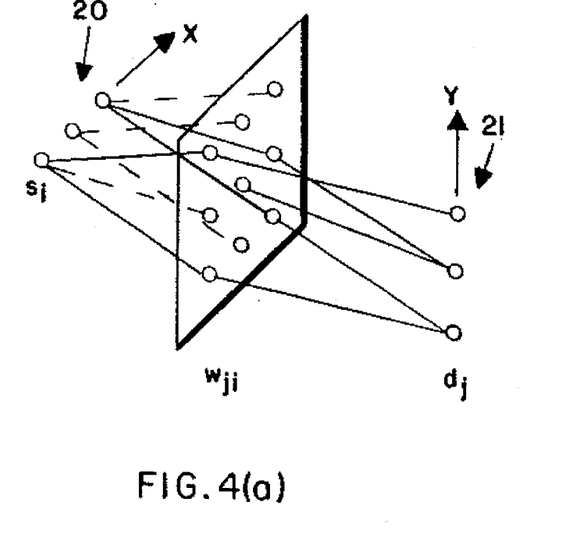
FIG. 4(a) illustrates conceptually a many-to-many (M×M) irregular reconfigurable optical interconnection network.
Figure 4B:
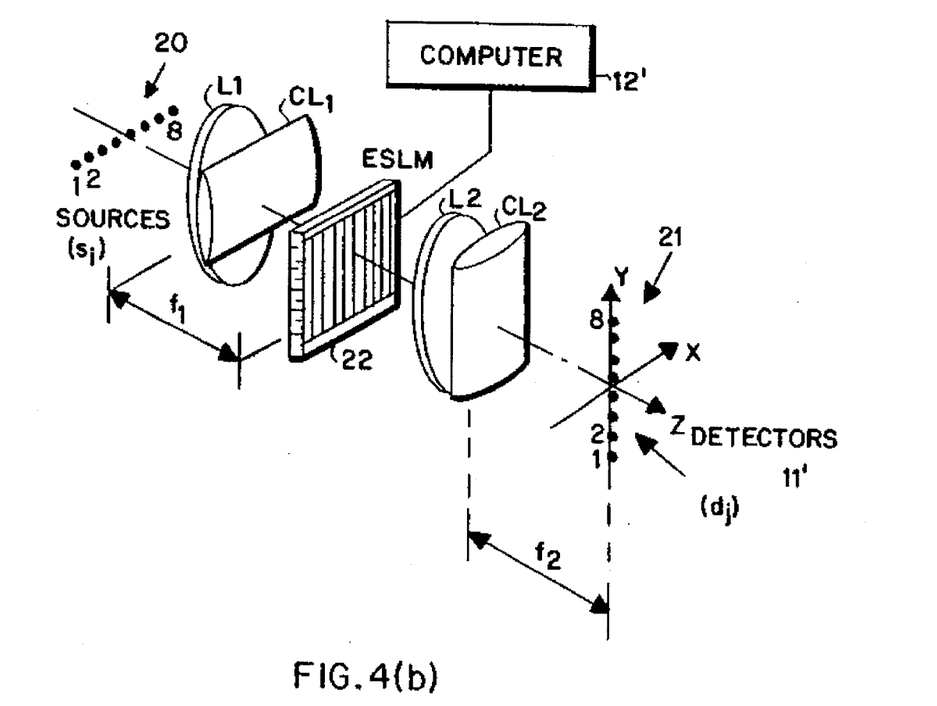
FIG. 4(b) illustrates an implementation of the M×M interconnection network of FIG. 4(a).

Strength-adjustable many-to-many interconnections, illustrated conceptually in FIG. 4(a) may be implemented as shown in FIG. 4(b). Referring first to FIG. 4(a), a plurality of sources $s_i$ (i=0,1, ... N−1) and N detectors $d_j$ (j=0,1, ... N−1) are interconnected with adjustable weights $w_{ji}$. Referring now to FIG. 4(b), assume the same linear array arrangement of sources 20 and detectors 21, but one oriented vertically and the other horizontally, although optical elements could be used to rotate the linear array of detectors 90° so they are oriented parallel to the linear array of the sources. The laser beams from the sources 20 are extended and collimated in the vertical direction by means of a spherical lens $L_1$ and a cylindrical lens $CL_1$ to illuminate N different columns of an electrically addressed spatial light modulator (ESLM) 22. Each column of the spatial light modulator is used to store a sub-CGH used to generate 1×j (j=0,1, ... N−1) beams. A set of spherical lens $L_2$ and cylindrical lens $CL_2$ is used to first Fourier transform the N sub-CGHs and then combine these N diffraction fields so that these N different sub-CGHs may form N individual beams for N interconnections. The power sensed at an output detector $d_j$ may be written as $$d_j = \sum_{i=0}^{N-1} w_{ji} s_i \qquad (4)$$

where $w_{ji}$ is the $ji^{th}$ element in the interconnection weight matrix (IWM) determined by the sub-CGHs which are, of course, adjustable in the computer 12 used to generate the sub-CGHs. In that manner, weighted interconnections between the two terminals of the detectors are provided at the spatial points where the detectors are positioned.

Figure 5:
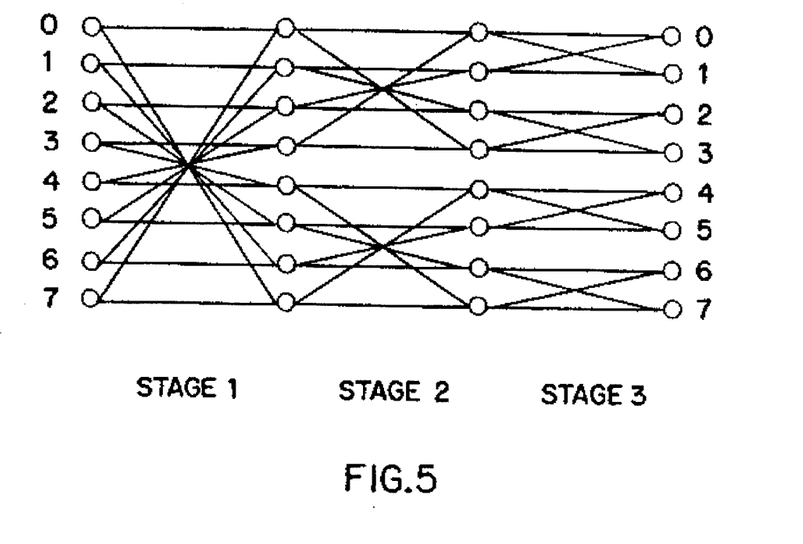
FIG. 5 illustrates conceptually a three-stage crossover network (N=8) utilizing the many-to-many arrangement of FIGS. 3(a) and 3(b) for each stage.

A variety of networks can be realized by the strength-adjustable many-to-many interconnection technique. Networks such as perfect shuffler and crossbar may be implemented via a single layer strength-adjustable many-to-many interconnection. The multistage interconnection networks such as crossover [J. Jahns et al., Appl. Opt., 27, 3155 (1988), Clos [C. Clos, Bell Sys. Tech. J., 32, 406 (1953)], Benes [V. Benes, Bell Sys. Tech. J., 41, 1481 (1962)], Omega [D. H. Lawire, IEEE Trans. Comput., C-24, 1145 (1975)] and Baseline [C. Wu et al., IEEE Trans. Comput., C-29, 694 (1980)] may be implemented by cascading several strength-adjustable many-to-many interconnections. As an example, a three-stage crossover interconnection shown in FIG. 5 may be implemented as follows. The $j^{th}$ output permutation of the power of the crossover may be represented as $$d_j^{(1)} = s_j + s_{N-1-j} \qquad (5a)$$

for the first stage where the stage number is denoted by the superscript in parenthesis "(1)", and N must be an integral power of two. The output of the first stage is used as input to the second stage. The permutation of the second stage output $d_j^{(2)}$ may be written as $$d_j^{(2)} = \begin{cases} d_j^{(1)} + d_{N/2-j-1}^{(1)}; & 0 \leq j \leq N/2 - 1 \\ d_j^{(1)} + d_{3N/2-j-1}^{(1)}; & N/2 \leq j \leq N - 1 \end{cases}$$

For the third stage, the permutation of the output $d_j^{(3)}$ may be written as $$d_j^{(3)} = \begin{cases} d_j^{(2)} + d_{N/4-j-1}^{(2)}; & 0 \leq j \leq N/4 - 1 \\ d_j^{(2)} + d_{3N/4-j-1}^{(2)}; & N/4 \leq j \leq N/2 - 1 \\ d_j^{(2)} + d_{5N/4-j-1}^{(2)}; & N/2 \leq j \leq 3N/4 - 1 \\ d_j^{(2)} + d_{7N/4-j-1}^{(2)}; & 3N/4 \leq j \leq N - 1 \end{cases} \qquad (5c)$$

For N=8, the first stage IWM may be written as $$W^{(1)} = \begin{bmatrix} 1 & 0 & 0 & 0 & 0 & 0 & 0 & 1 \\ 0 & 1 & 0 & 0 & 0 & 0 & 1 & 0 \\ 0 & 0 & 1 & 0 & 0 & 1 & 0 & 0 \\ 0 & 0 & 0 & 1 & 1 & 0 & 0 & 0 \\ 0 & 0 & 0 & 1 & 1 & 0 & 0 & 0 \\ 0 & 0 & 1 & 0 & 0 & 1 & 0 & 0 \\ 0 & 1 & 0 & 0 & 0 & 0 & 1 & 0 \\ 1 & 0 & 0 & 0 & 0 & 0 & 0 & 1 \end{bmatrix} \qquad (6a)$$

For the second stage, $$W^{(2)} = \begin{bmatrix} 1 & 0 & 0 & 1 & 0 & 0 & 0 & 0 \\ 0 & 1 & 1 & 0 & 0 & 0 & 0 & 0 \\ 0 & 1 & 1 & 0 & 0 & 0 & 0 & 0 \\ 1 & 0 & 0 & 1 & 0 & 0 & 0 & 0 \\ 0 & 0 & 0 & 0 & 1 & 0 & 0 & 1 \\ 0 & 0 & 0 & 0 & 0 & 1 & 1 & 0 \\ 0 & 0 & 0 & 0 & 0 & 1 & 1 & 0 \\ 0 & 0 & 0 & 0 & 1 & 0 & 0 & 1 \end{bmatrix} \qquad (6b)$$

and for the third stage $$W^{(3)} = \begin{bmatrix} 1 & 1 & 0 & 0 & 0 & 0 & 0 & 0 \\ 1 & 1 & 0 & 0 & 0 & 0 & 0 & 0 \\ 0 & 0 & 1 & 1 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 1 & 1 & 0 & 0 \\ 0 & 0 & 0 & 0 & 0 & 0 & 1 & 1 \\ 0 & 0 & 0 & 0 & 0 & 0 & 1 & 1 \end{bmatrix} \qquad (6c)$$

From these results, eight 1×2 strength-adjustable sub-CGHs of SBWP=8 are needed for each stage.

Computer Simulations and Experimental Results

Figure 6:
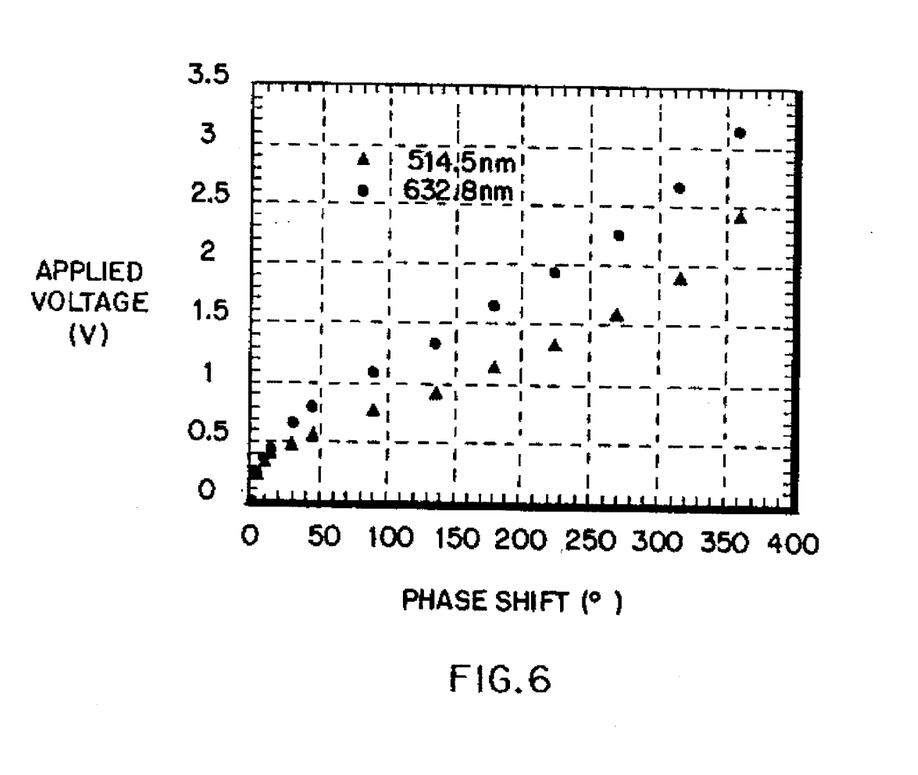
FIG. 6 is a graph of phase shift of a liquid crystal television (LCTV) ESLM versus applied voltage (from 0 to 0.35 V) at two different wavelengths plotted by a dot for 632.8 nm and 514.5 nm.
Figure 7A:
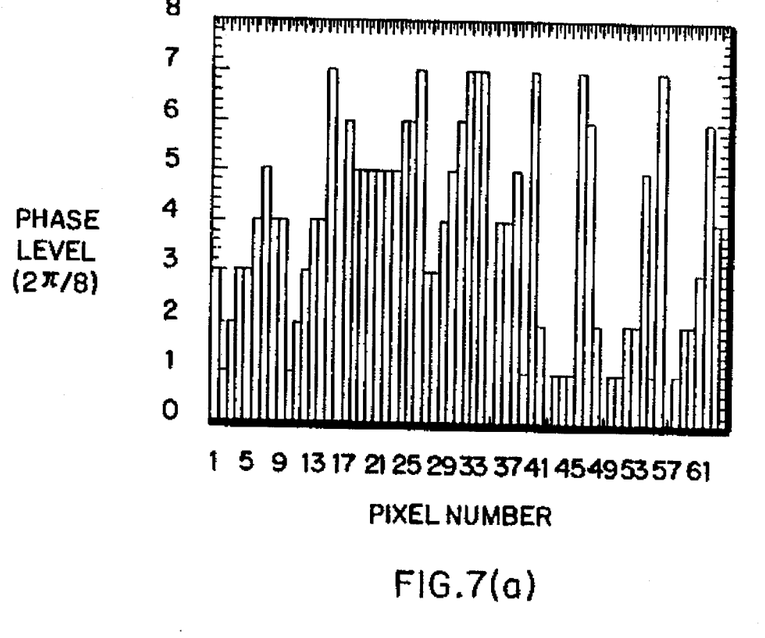
FIG. 7(a) illustrates phase level distribution.
Figure 7B:
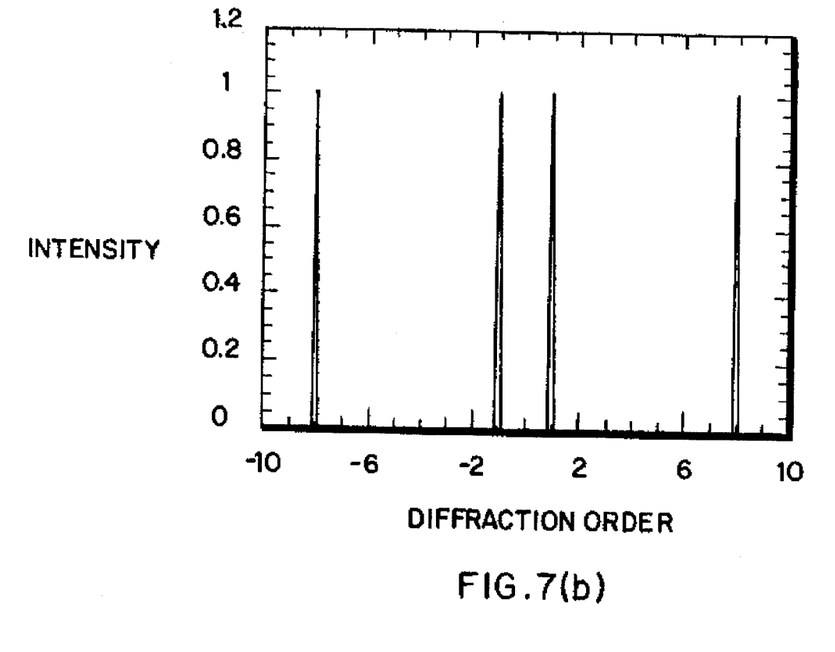
FIG. 7(b) illustrates diffraction field. The parameters are M=64, q=3:1, a=58 µm, $T_g$=0.04, $T_c$=0.96, s=0.04, and $\phi_d$=20°.
Figure 8A:
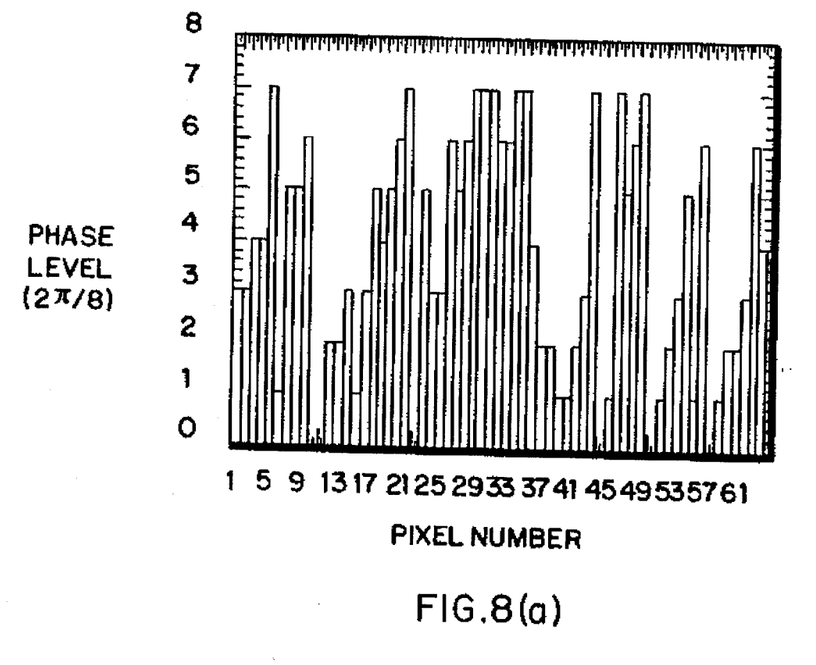
FIG. 8(a) illustrates phase level distribution.
Figure 8B:
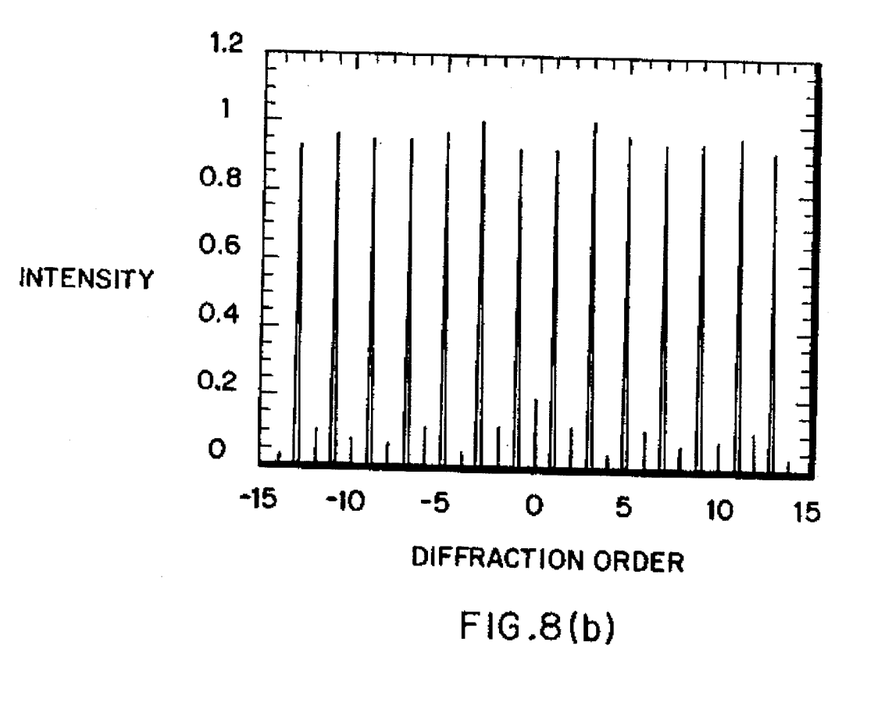
FIG. 8(b) illustrates diffraction field. The parameters are M=64, q=3:1, a=58 µm, $T_g$=0.04, $T_c$=0.96, s=0.04, and $\phi_d$=20°.
Figure 9A:
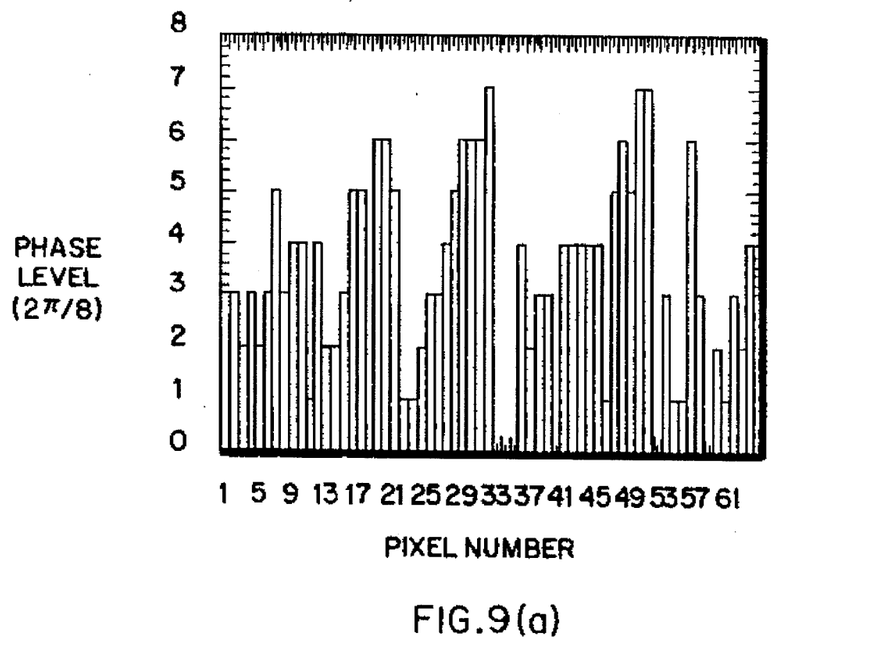
FIG. 9(a) illustrates phase level distribution.
Figure 9B:
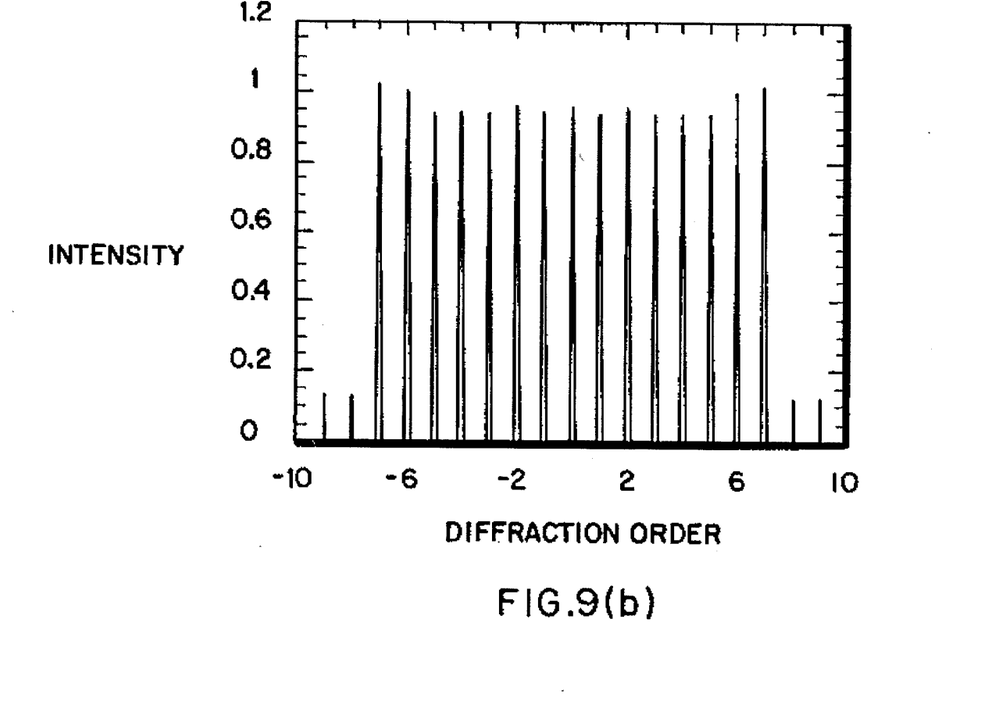
FIG. 9(b) illustrates diffraction field. The parameters are M=64, q=3:1, a=58 µm, $T_g$=0.04, $T_c$=0.96, s=0.04, and $\phi_d$=20°.
Figure 10A:
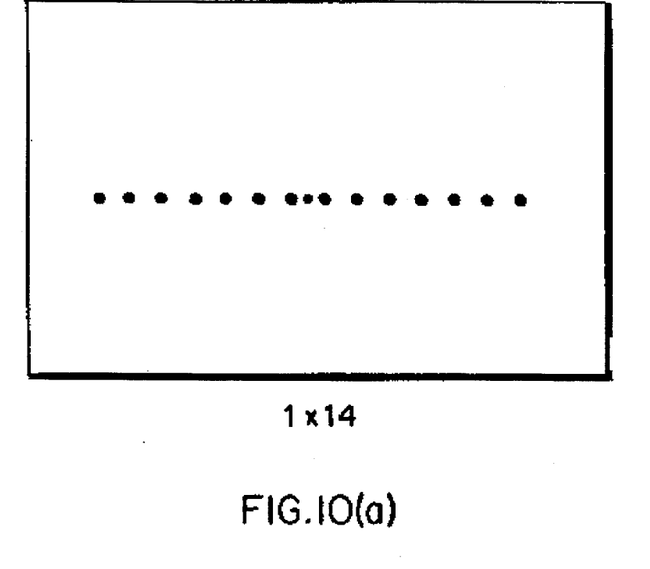
FIG. 10(a) illustrates results for one-to-fourteen (±1, ±3, ... , ±13 order outputs)
Figure 10B:
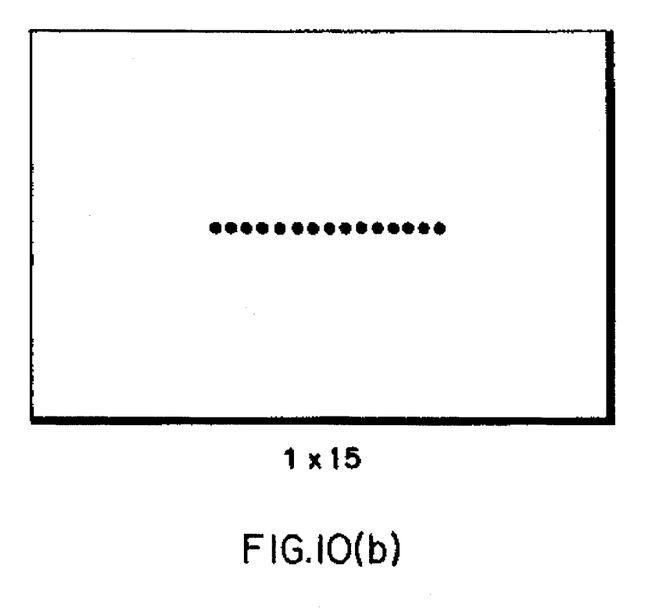
FIG. 10(b) illustrates results for one-to-fifteen (0, ±1, ±2, ... , ±7 order outputs).

As noted with reference to FIGS. 1(a), (b) and (c) and 2(a), (b), the computer-generated holograms may be amplitude or phase, although amplitude CGHs are implied throughout. The following computer simulations and results were carried out with phase holograms for convenience in implementation of the computer program since they are equivalent and a Seiko-Epson liquid-crystal television (LCTV) ESLM operated in phase mode was available. First it was necessary to establish a look-up table between the phase shift on the spatial light modulator ESLM and the applied voltage for phase control. FIG. 6 gives the experimental result of the relationship between phase shift and applied voltage. The results of using a He-Ne laser and an Ar+ laser are shown. The dark phase $\phi_d$ was not considered in the figure. The phase shift is measured by means of a Mach-Zehnder interferometer. Other parameters of the LCTV are measured and the results are q=3:1, a=58 μm, $T_g$=0.04 and s=4%. $T_c$ is varied with an unexpected amplitude ±10% within the region from 0–3.5 V because of the imperfect alignment of the liquid crystal molecules on the thin film transistor substrate [A. Marrakchi et al., (1991), supra]. An average value, $T_c$=0.96 is used in the computer simulations for simplifying the calculation process. The results of (a) pixel structures and (b) relative intensities for the computer simulation of several kinds of CGHs useful for making different interconnections are presented in FIG. 7 through FIG. 9. FIGS. 7(a) and 7(b) illustrate computer simulation results for an example of one-to-two interconnection CGH using the 1st and 8th order outputs. FIG. 7(a) illustrates phase level distribution, and FIG. 7(b) illustrates diffraction field. The parameters are M=64, q=3:1, a=58 μm, $T_g$=0.04, $T_c$=0.96, s=0.04, and $\phi_d$=20°. FIGS. 8(a) and 8(b) illustrate computer simulation results for an example of one-to-fourteen interconnection CGH using ±1, ±3, . . ., ±13 order outputs. FIG. 8(a) illustrates phase level distribution, and FIG. 8(b) illustrates diffraction field. The parameters are M=64, q=3:1, a=58 μm, $T_g$=0.04, $T_c$=0.96, s=0.04, and $\phi_d$=20°. FIGS. 9(a) and 9(b) illustrate computer simulation results for an example of one-to-fifteen interconnection CGH using ±1, ±2, . . . , ±7 order outputs. FIG. 9(a) illustrates phase level distribution, and FIG. 9(b) illustrates diffraction field. The parameters are M=64, q=3:1, a=58 μm, $T_g$=0.04, $T_c$=0.96, s=0.04, and $\phi_d$=20°. The experimental results demonstrating 1×14 and 1×15 interconnections are given in FIG. 10(a) and 10(b), which illustrate experimental results. FIG. 10(a) illustrates results for one-to-fourteen (±1, ±3, . . . , ±13 order outputs), and FIG. 10(b) illustrates results for one-to-fifteen (0, ±1, ±2, . . . , ±7 order outputs).

The consideration described above is based upon the assumption that N inputs are incoherent. However, if the input is a coherent source instead of the incoherent source array, constructive and destructive interference may affect the output. The power change caused by the interference on the vertical axis is not very significant if the ratio R between the horizontal dimension of the sub-CGH and the interval between the two nearest neighbor sub-CGHs is much less than one. For the same LCTV-ESLM, M=64, L=8, N=8, and R=0.1, computer simulation results show that the percentage decrease of the power is less than 5%.

We claim:

1. A system for providing dynamically programable optical interconnections comprising a spatial light modulator having a $K_1 \times K_1$ array of areas of transmittance pixels, said pixels of each area being adapted to separately modify transmittance of light through each pixel thereof in response to a plurality of separate subholograms defined by a pattern of electrical signals, one subhologram for each area of said $K_1 \times K_1$ array, means for producing a plurality of parallel light beams, including a single source of light and a multiple beam splitter for producing said plurality of parallel light beams, one light beam for each of a plurality of areas of said spatial light modulator, each area having a separate array of pixels, each light beam illuminating for transmittance a separate one of said $K_1 \times K_1$ areas of said spatial light modulator, and an array of light detectors positioned to receive said light beams transmitted through said $K_1 \times K_1$ areas of said spatial light modulator, whereby light detected at each of said light detectors provides conduction in response to light received, thereby providing many irregular interconnections in response to a plurality of light beams in patterns determined by said plurality of subholograms, a computer for generating said plurality of subholograms for producing rapid reconfigurable interconnections at said array of light detectors, and a binary spatial light filter positioned in the path of light through said spatial light modulator to impose a pattern of pixel spots of no light transmitted through said spatial light modulator, thereby increasing the number of patterns of irregular interconnections producible at said array of detectors.

2. A system for providing dynamically programmable optical interconnections comprising a spatial light modulator having a $K_1 \times K_1$ array of areas of transmittance pixels, said pixels of each area being adapted to separately modify transmittance of light through each pixel thereof in response to a plurality of separate subholograms defined by a pattern of electrical signals, one subhologram for each area of said $K_1 \times K_1$ array, means for producing a plurality of parallel light beams, each light beam illuminating for transmittance a separate one of said $K_1 \times K_1$ areas of said spatial light modulator, and an array of light detectors positioned to receive said light beams transmitted through said $K_1 \times K_1$ areas of said spatial light modulator, whereby light detected at each of said light detectors provides conduction in response to light received, thereby providing many irregular interconnections in response to a plurality of light beams in patterns determined by said plurality of subholograms, a computer for generating said plurality of subholograms for producing rapid reconfigurable interconnections at said array of light detectors, a plurality of different columns of cells in said spatial light modulator, each column of cells receiving a separate computer generated subhologram, and including a plurality of sources of light, $s_i$, means for extending and collimating in one direction each of said sources of light to illuminate corresponding ones of said plurality of columns of pixels in said spatial light modulator, means for recombining light transmitted by said plurality of columns of pixels to produce a plurality of individual beams, one beam for each row, and said array of detectors comprises a column of detectors, $d_j$, one for each of said individual beams, thereby producing from each detector an interconnection, the strength of conduction of each interconnection of each N detectors being equal to $$d_j = \sum_{i=0}^{N-1} w_{ji} s_i$$

whereby each column of cells in said spatial light modulator receives a separate computer generated subhologram to generate $1 \times j (j=0,1,\ldots N-1)$ beams transmitted to $1 \times j = (j=0,1,\ldots N-1)$ detectors in response to $i \times i = (i=0,1,\ldots N-1)$ sources of light and $w_{ji}$ is the $j^{ith}$ element of an interconnection weight matrix determined by said computer generated subholograms, thereby providing weighted interconnections at said detectors.

3. A system for providing dynamically programmable optical interconnections comprising a spatial light modulator having a $K_1 \times K_1$ array of areas of transmittance pixels, said pixels of each area being adapted to separately modify transmittance of light through each pixel thereof in response to a plurality of separate subholograms defined by a pattern of electrical signals, one subhologram for each area of said $K_1 \times K_1$ array, means for producing a plurality of parallel light beams, each light beam illuminating for transmittance a separate one of said $K_1 \times K_1$ areas of said spatial light modulator, and an array of light detectors positioned to receive said light beams transmitted through said $K_1 \times K_1$ areas of said spatial light modulator, whereby light detected at each of said light detectors provides conduction in response to light received, thereby providing many irregular interconnections in response to a plurality of light beams in patterns determined by said plurality of subholograms, including a plurality of cascaded spatial light modulators between said light sources and said detectors for providing multistage crossover interconnections, wherein the light beams of each spatial light modulator become the sources of light beams for the next spatial light modulator in cascade, and the $j^{th}$ output permutation of the power of the crossover is represented by $$d_j^{(1)} = s_j + s_{N-1-j}$$

for the first stage where the stage number is denoted by the superscript in parenthesis, and N must be an integral power of two, wherein the output of the first stage is used as input to the second stage the permutation of the second stage output $d_j^{(2)}$ may be written as $$d_j^{(2)} = \begin{cases} d_j^{(1)} + d_{N/2-j-1}^{(1)}; & 0 \leq j \leq N/2 - 1 \\ d_j^{(1)} + d_{3N/2-j-1}^{(1)}; & N/2 \leq j \leq N - 1 \end{cases}$$

and so forth to the permutation of the last stage.

* * * * *